United States Patent
Tomono et al.

(10) Patent No.: US 10,764,529 B2
(45) Date of Patent: Sep. 1, 2020

(54) FIXING APPARATUS, FIXING METHOD, AND FIXING PROGRAM

(71) Applicant: PIONEER CORPORATION, Bunkyo-ku, Tokyo (JP)

(72) Inventors: Mizuki Tomono, Tokyo (JP); Yukihito Wada, Tokyo (JP)

(73) Assignee: PIONEER CORPORATION, Bunkyo-Ku, Tokyo (JP)

( * ) Notice: Subject to any disclaimer, the term of this patent is extended or adjusted under 35 U.S.C. 154(b) by 0 days.

(21) Appl. No.: 16/462,863

(22) PCT Filed: Nov. 9, 2017

(86) PCT No.: PCT/JP2017/040369
§ 371 (c)(1),
(2) Date: May 21, 2019

(87) PCT Pub. No.: WO2018/092667
PCT Pub. Date: May 24, 2018

(65) Prior Publication Data
US 2020/0068163 A1     Feb. 27, 2020

(30) Foreign Application Priority Data
Nov. 21, 2016    (JP) .................................. 2016-226353

(51) Int. Cl.
*H04N 5/64*      (2006.01)
*B60R 11/02*     (2006.01)

(52) U.S. Cl.
CPC ............ *H04N 5/64* (2013.01); *B60R 11/0235* (2013.01)

(58) Field of Classification Search
CPC ....... H04N 5/64; B60R 11/0235; B60R 11/02; G06F 1/1601; F16M 11/041
See application file for complete search history.

(56) References Cited

U.S. PATENT DOCUMENTS

2008/0169402 A1*   7/2008   Sturt ................... B60R 11/0235
                                                                              248/326
2009/0201433 A1*   8/2009   Hayashi ............. B60R 11/0235
                                                                              348/837

(Continued)

FOREIGN PATENT DOCUMENTS

JP         2005-43676 A     2/2005
JP         2009-184581 A    8/2009

(Continued)

OTHER PUBLICATIONS

International Search Report for related International Application No. PCT/JP2017/040369, dated Jan. 23, 2018; English translation provided; 3 pages.

*Primary Examiner* — Neil R Mikeska
(74) *Attorney, Agent, or Firm* — Procopio, Cory, Hargreaves & Savitch LLP

(57) ABSTRACT

Provided is a fixing apparatus which enables, when a large display is used in front of a console, easy and smooth detachment of the display itself, including touch sensor groups which respectively detect a contact with or a close approach to a display unit which is supported by a casing and which includes a display surface, from the display surface F side, and detect a contact with or a close approach to the display unit from the back surface side; and a control unit which enables detachment of the display unit from a joining arm which couples the casing and the display unit, in the case where the display unit is fixed to the joining arm, and when the contact with or the close approach from the display surface side is detected and the contact with or the close approach from the back surface side is detected.

10 Claims, 9 Drawing Sheets

(56) References Cited

U.S. PATENT DOCUMENTS

2013/0147847 A1    6/2013  Koseki et al.
2018/0056785 A1*   3/2018  Lin ..................... B60K 37/02

FOREIGN PATENT DOCUMENTS

JP    2013-003707 A    1/2013
JP    2013-121768 A    6/2013

* cited by examiner

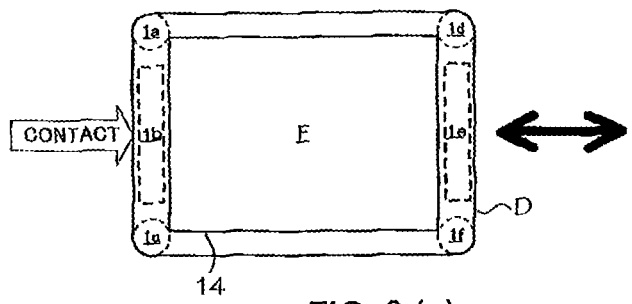
FIG. 9 (a)
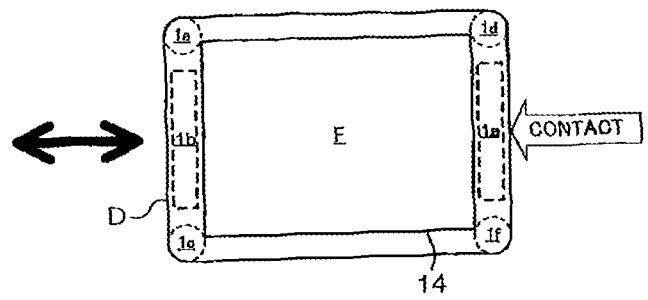
FIG. 9 (b)
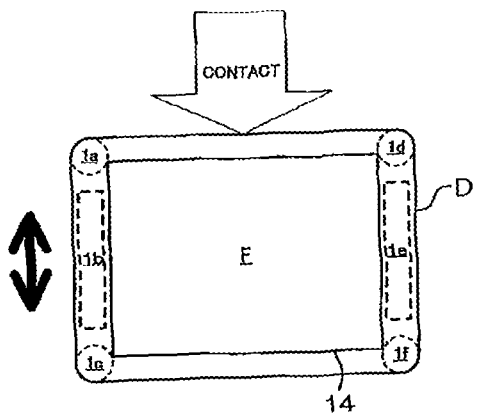
FIG. 9 (c)
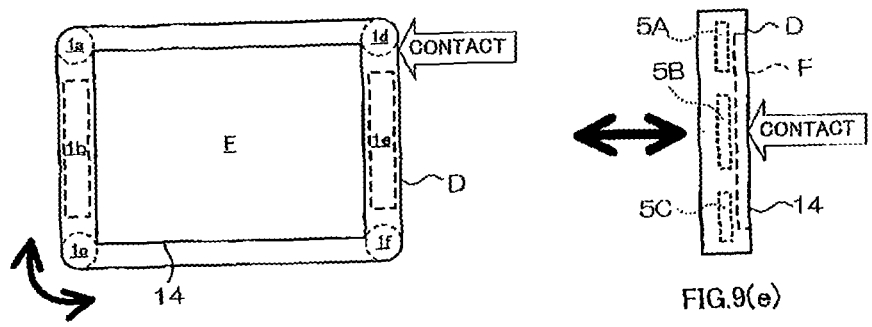
FIG. 9 (d)
FIG. 9 (e)

FIXING APPARATUS, FIXING METHOD, AND FIXING PROGRAM

CROSS-REFERENCE TO RELATED APPLICATIONS

This application is a U.S. National Stage entry of PCT Application No: PCT/JP2017/040369 filed Nov. 9, 2017, which claims priority to Japanese Patent Application No. 2016-226353, filed Nov. 21, 2016, the contents of which are incorporated herein by reference.

TECHNICAL FIELD

The present application relates to the technical field of fixing apparatus, fixing methods, and fixing programs. More specifically, the present application relates to the technical field of a fixing apparatus and a fixing method for controlling the fixed state of a display unit such as a liquid crystal display, and a program for the fixing apparatus.

BACKGROUND ART

In recent years, in-vehicle apparatuses comprising display units such as liquid crystal displays have been widely spread. Such an in-vehicle apparatus performs, for example, a navigation process accompanied by map display on the above-mentioned display unit and a process of reproducing content designated by a user (such as a passenger of the vehicle, for example) using the display unit, and the like. With the above usage being taken into account, the above-mentioned display unit is preferably large in size.

Meanwhile, in regard to the above point, the size (width) of the interior of the vehicle is limited, and there is also a need to secure vision of the driver at the time of driving or the like. Therefore, various efforts need to be made to increase the size of the display unit. In addition, an example of a conventional technique taking such efforts into account is the technique disclosed in Patent Document 1 mentioned below.

Patent Document 1 discloses a configuration in which a large-sized rectangular display is made to protrude inside the vehicle when the display is used, and horizontal usage and vertical usage of the display (or rotation of the display) are controlled in accordance with the display content on the display. The display content in this case may be a map, icons for operation, or the like, for example. In addition, as for the rotation control, there also is a disclosed configuration in which the position of the upper side of the display in horizontal usage and the position of the upper side in vertical usage are made to substantially coincide with each other, so that the vision of the driver is not hindered even if the display is rotated. Further, there is a disclosed configuration in which, when proximity of a hand of the driver or a passenger is detected by a so-called proximity sensor, the above-mentioned rotation control is performed, and the rotation is coordinated with slide movement of the display.

CITATION LIST

Patent Document

Patent Document 1: JP 2013-121768 A

SUMMARY OF THE INVENTION

Problem to be Solved by the Invention

Here, using a large-sized display as disclosed in the above-mentioned Patent Document 1 is advantageous, because of the high visibility of display content and the large amount of information that can be displayed at one time. However, in a case where the display is used in front (on the interior side) of the console unit in which operation buttons and the like are disposed in the first place, for example, there was a problem that the operation buttons and the like are hidden behind the display due to its size. In this case, it would be convenient if the display itself can be easily and smoothly detached. There also will be a possibility that the detached display can be used for other purposes.

Therefore, the present application is made in view of the above problems and requirements, and an example of the object is to provide a fixing apparatus and a fixing method that enable easy and smooth detachment of a large-sized display in a case where the large-sized display is used in front of a console unit, and a program for the fixing apparatus.

Means for Solving the Problem

In order to solve the above-mentioned problem, the invention described in claim 1 comprises a first detection unit that detects contact with or proximity to a display unit from a side of a display surface of the display unit, the display unit being supported by a support unit and comprising the display surface; a second detection unit that detects contact with or proximity to the display unit from the opposite side from the display surface; and a control unit that, in a case where the display unit is fixed to a joining unit that joins the support unit to the display unit, makes the display unit detachable from the joining unit, when the contact or the proximity from the side of the display surface is detected by the first detection unit and the contact or the proximity from the opposite side is detected by the second detection unit.

In order to solve the above-mentioned problem, the invention described in claim 9 is a fixing method implemented in a fixing apparatus that comprises: a first detection unit that detects contact with or proximity to a display unit from a side of a display surface of the display unit, the display unit being supported by a support unit and including the display surface; a second detection unit that detects contact with or proximity to the display unit from the opposite side from the display surface; and a control unit, the fixing method comprising a control step of making, in a case where the display unit is fixed to a joining unit that joins the support unit to the display unit, the display unit detachable from the joining unit, when the contact or the proximity from the side of the display surface is detected by the first detection unit, and the contact or the proximity from the opposite side is detected by the second detection unit, the control step being carried out by the control unit.

In order to solve the above-mentioned problem, the invention described in claim 10 is executed by a computer in a fixing apparatus that comprises: a first detection unit that detects contact with or proximity to a display unit from a side of a display surface of the display unit, the display unit being supported by a support unit and including the display surface; a second detection unit that detects contact with or proximity to the display unit from the opposite side from the display surface; and a control unit, the invention causing the computer to function as a control unit that makes, in a case where the display unit is fixed to a joining unit that joins the support unit to the display unit, the display unit detachable from the joining unit, when the contact or the proximity from the side of the display surface is detected by the first detection unit, and the contact or the proximity from the opposite side is detected by the second detection unit.

BRIEF DESCRIPTION OF THE DRAWINGS

FIG. 2(a) is the above-mentioned block diagram, and FIG. 2(b) is a block diagram showing a detailed configuration of a display unit according to the example.

FIG. 4(a) is a front view, FIG. 4(b) is a back view, FIG. 4(c) is a top view, FIG. 4(d) is a bottom view, FIG. 4(e) is a left side view, and FIG. 4(f) is a right side view.

FIG. 8(a) is a diagram showing a first example mode of the rotation or movement, FIG. 8(b) is a diagram showing a second example mode of the rotation or movement, FIG. 8(c) is a diagram showing a third example mode of the rotation or movement, and FIG. 8(d) is a diagram showing a fourth example mode of the rotation or movement.

FIG. 9 is a diagram (II) showing modes of rotation or movement of the display unit according to the example: FIG. 9(a) is a diagram showing a fifth example mode of the rotation or movement, FIG. 9(b) is a diagram showing a sixth example mode of the rotation or movement, FIG. 9(c) is a diagram showing a seventh example mode of the rotation or movement, FIG. 9(d) is a diagram showing an eighth example mode of the rotation or movement, and FIG. 9(e) is a diagram showing a ninth example mode of the rotation or movement.

MODES FOR CARRYING OUT THE INVENTION

Next, a mode for carrying out the present application will be described with reference to FIG. 1. Note that FIG. 1 is a block diagram showing a schematic configuration of a fixing apparatus according to an embodiment.

Figure 1:
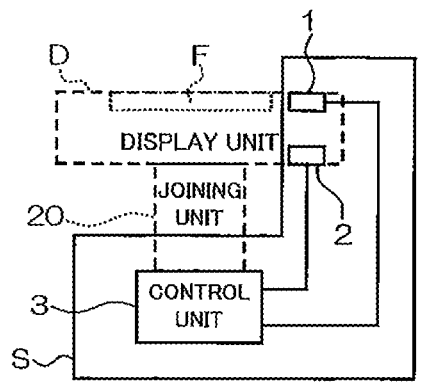
FIG. 1 is a block diagram showing a schematic configuration of a fixing apparatus according to an embodiment.

As shown in FIG. 1, a fixing apparatus S according to the embodiment comprises a first detection unit 1, a second detection unit 2, and a control unit 3.

In this configuration, the first detection unit 1 detects contact with or proximity to a display unit D from the side of the display surface F, the display unit D being supported by a support unit and comprising the display surface F. On the other hand, the second detection unit 2 detects contact with or proximity to the display unit D from the opposite side from the display surface F.

In addition, in a case where the display unit D is fixed to a joining unit 20 joining the support unit to the display unit D, the control unit 3 makes the display unit D detachable from the joining unit 20 when the first detection unit 1 detects contact or proximity from the side of the display surface F, and the second detection unit 2 detects contact or proximity from the opposite side.

As mentioned above, with the fixing apparatus S according to the embodiment, in a case where the display unit D is fixed to the joining unit 20, the display unit D is made detachable from the joining unit 20, when contact with or proximity to the display unit D is detected from the side of the display surface F, and contact with or proximity to the display unit D is also detected from the opposite side from the display surface F. Thus, the display unit D can be easily detached from the support unit 20, depending on contact with or proximity to the display unit D reflecting the user's intention.

EXAMPLE

Next, a specific example corresponding to the above-mentioned embodiment is described with reference to FIGS. 2 through 10. It should be noted that the example to be described below is an embodiment in a case where the above embodiment is applied to drive control or the like on the position of a display unit or the like that is provided in an in-vehicle navigation apparatus and is formed with a liquid crystal display or the like. In this case, as long as the apparatus comprises the above-mentioned display unit, the example can be applied not only to the above-mentioned navigation apparatus but also to an in-vehicle audiovisual (AV) apparatus or the like, for example.

Figure 2:
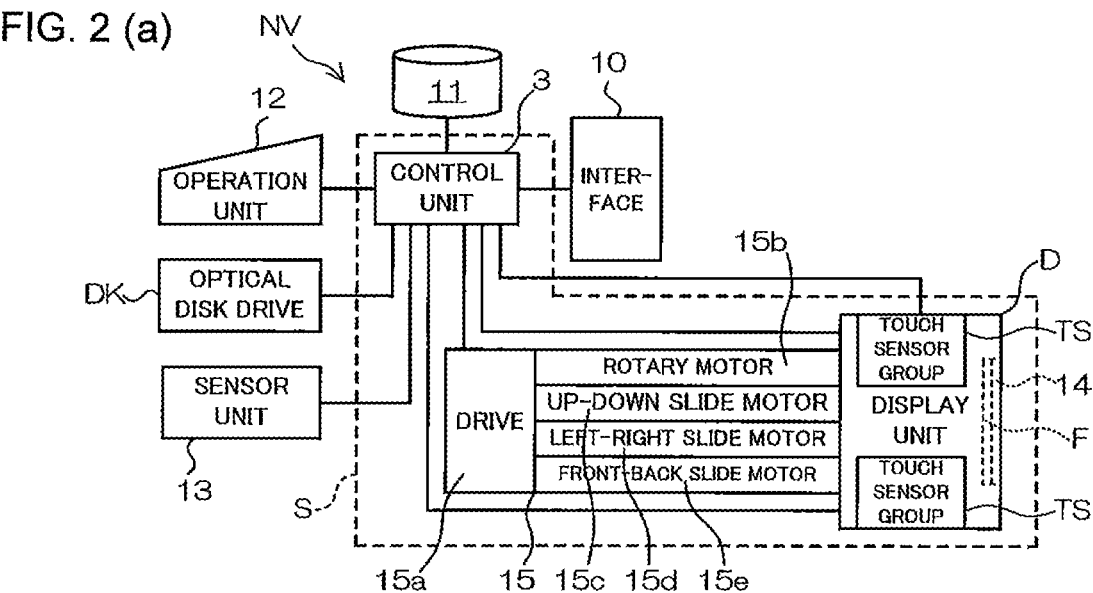
FIG. 2 is a block diagram and the like showing a schematic configuration of a navigation apparatus according to an example.
Figure 2:
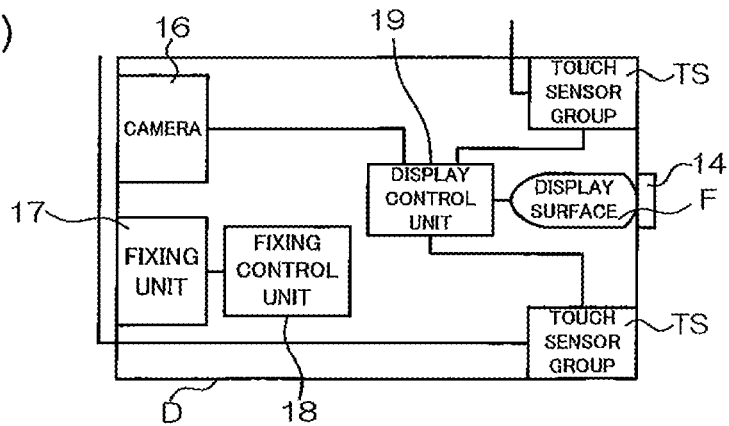
Figure 3:
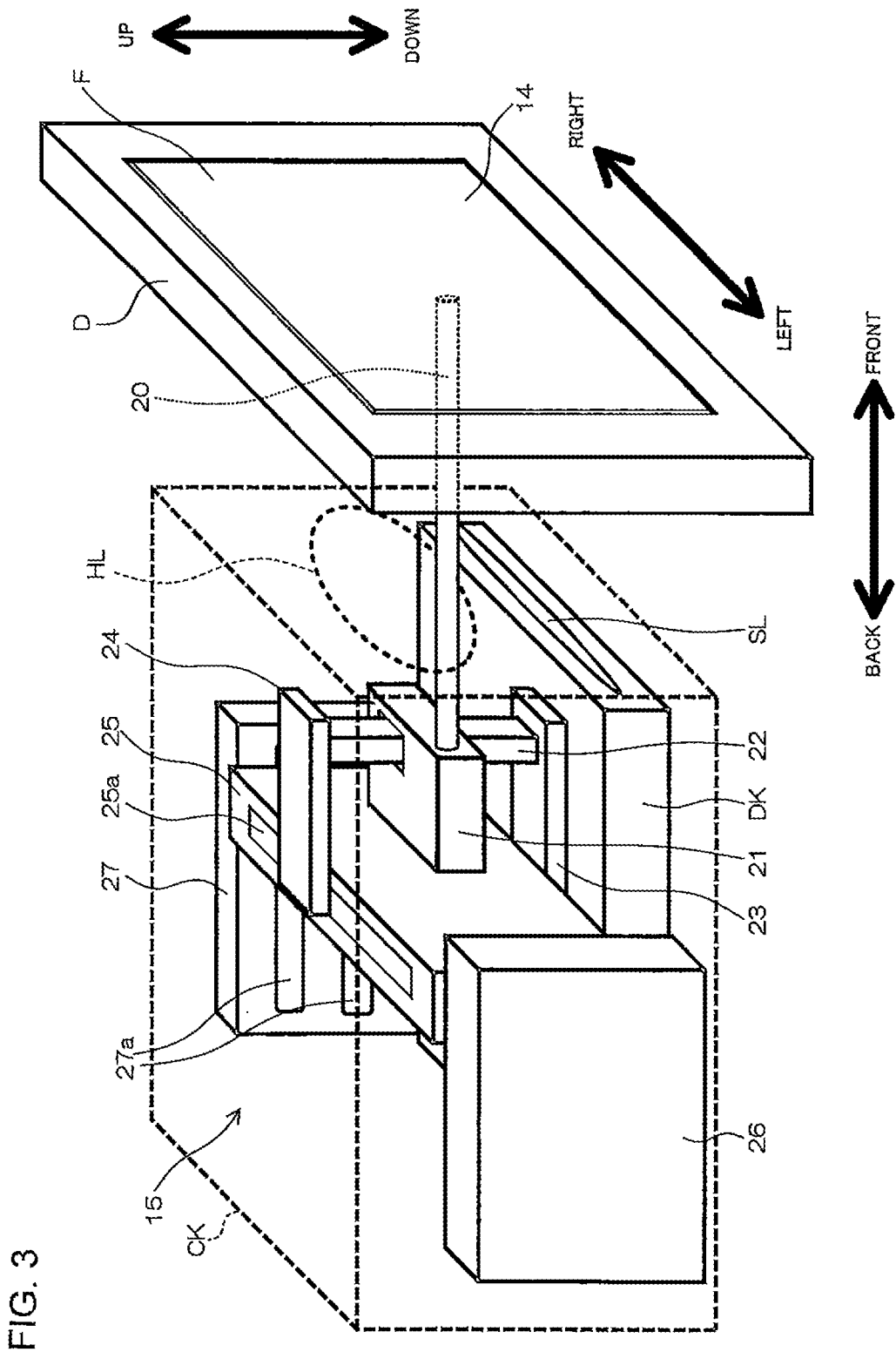
FIG. 3 is a perspective view in a case where the navigation apparatus according to the example is viewed from upper left front.
Figure 4:
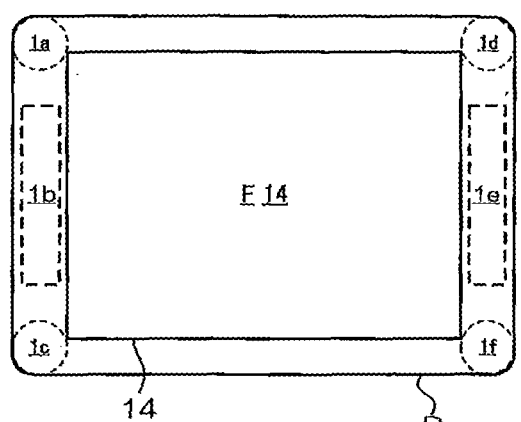
FIG. 4 shows six views of the exterior of the display unit according to the example.
Figure 4:
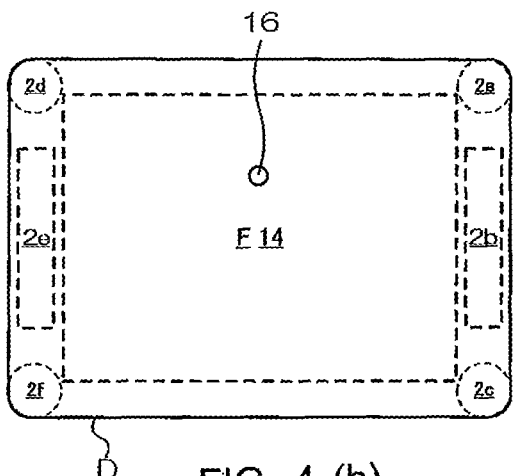
Figure 4:
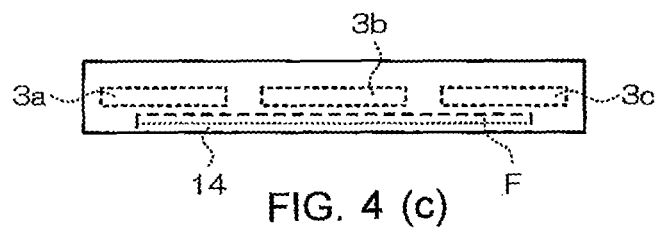
Figure 4:
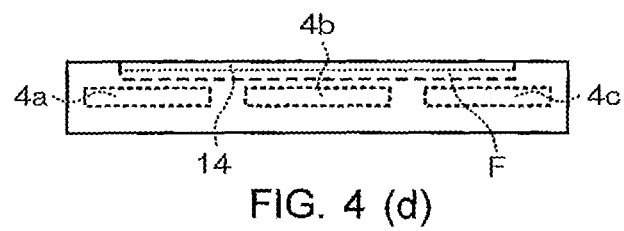
Figure 4:
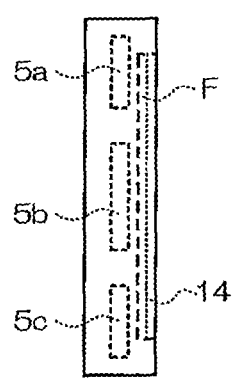
Figure 4:
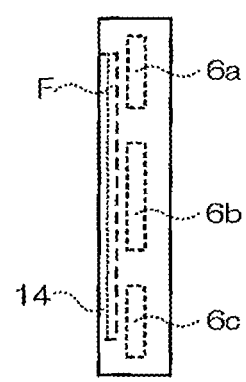
Figure 5:
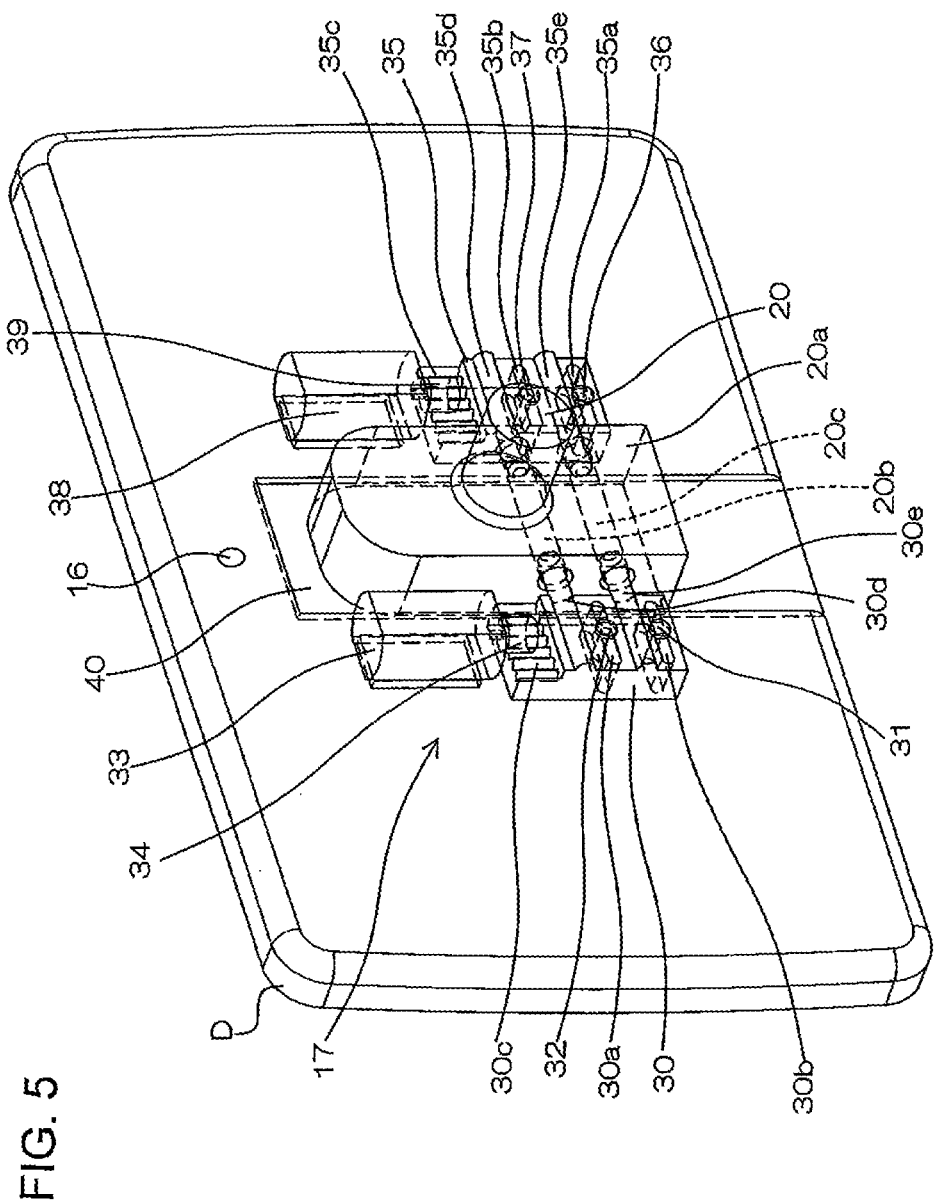
FIG. 5 is a perspective view in a case where the back surface of the display unit according to the example is viewed from the upper left back.
Figure 6:
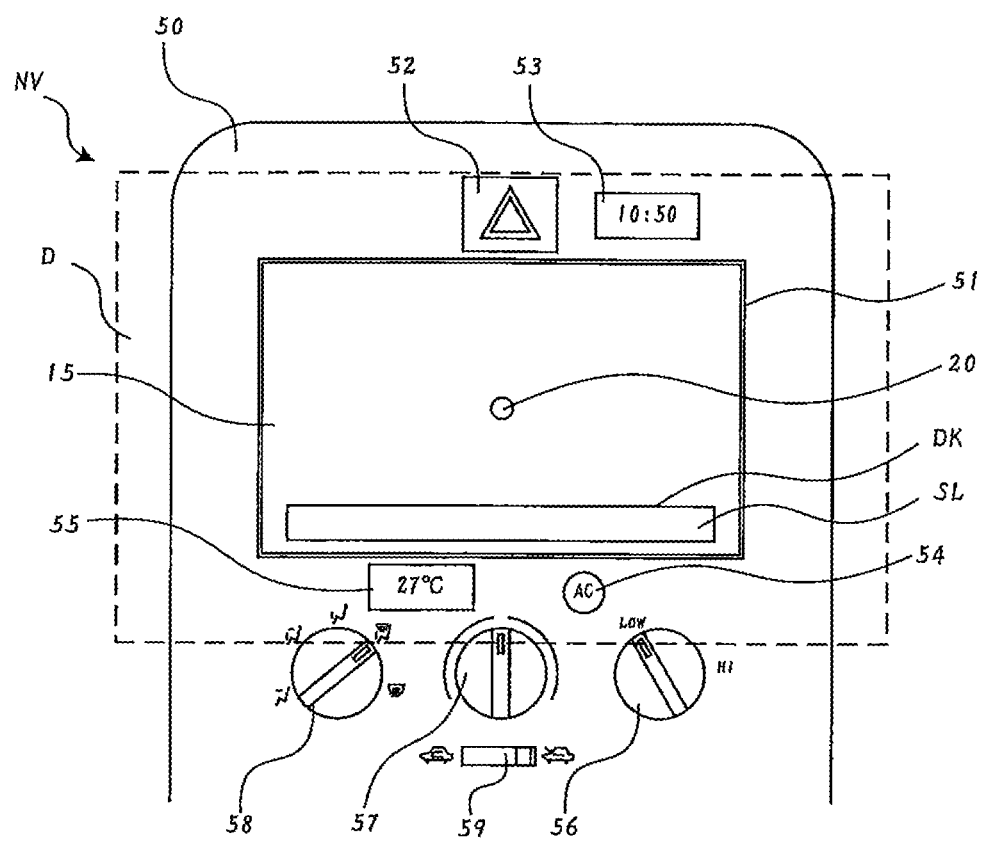
FIG. 6 is a schematic front view of an example of installation of the navigation apparatus according to the example.
Figure 7:
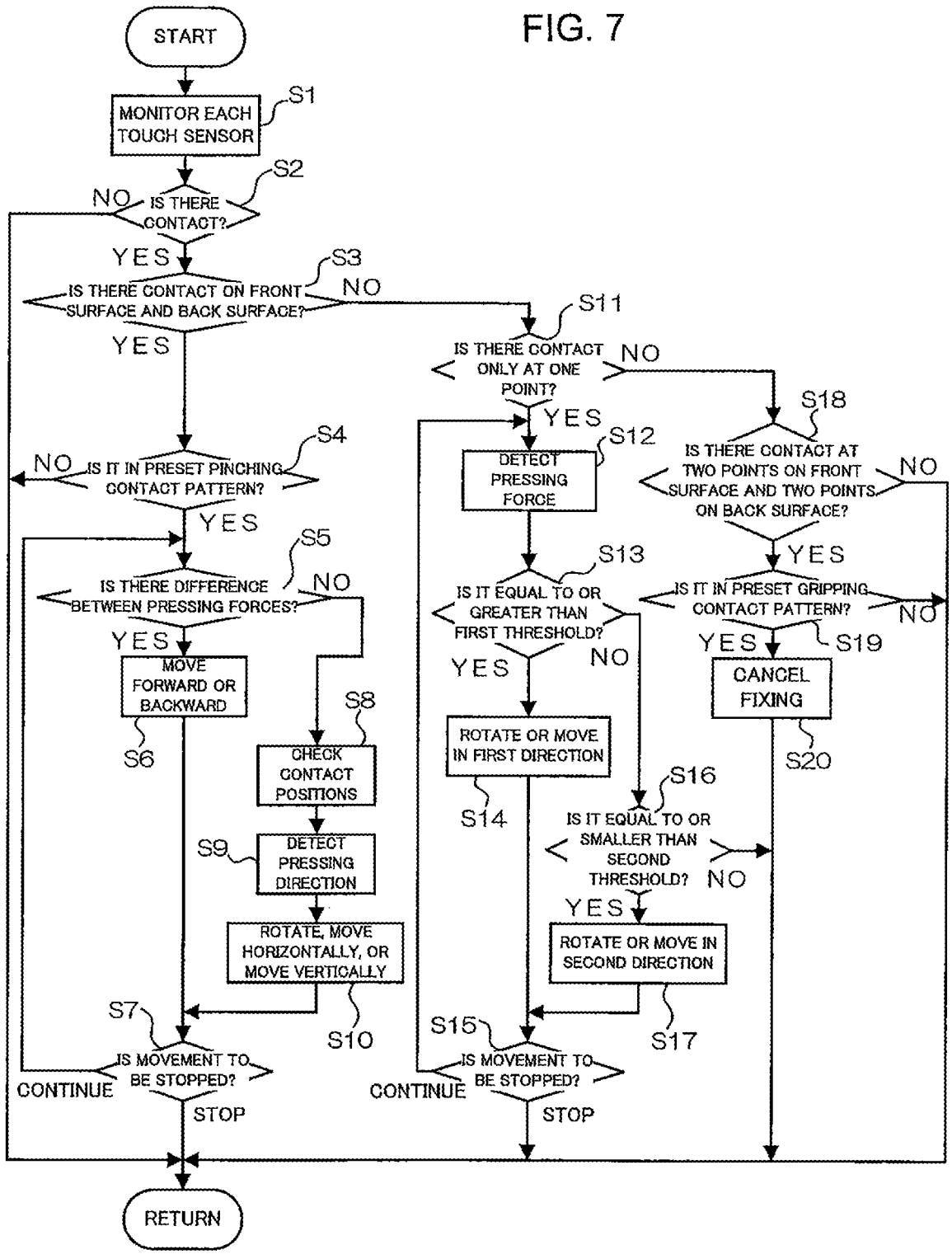
FIG. 7 is a flowchart showing rotation/movement control and the like of the display unit according to the example.
Figure 8:
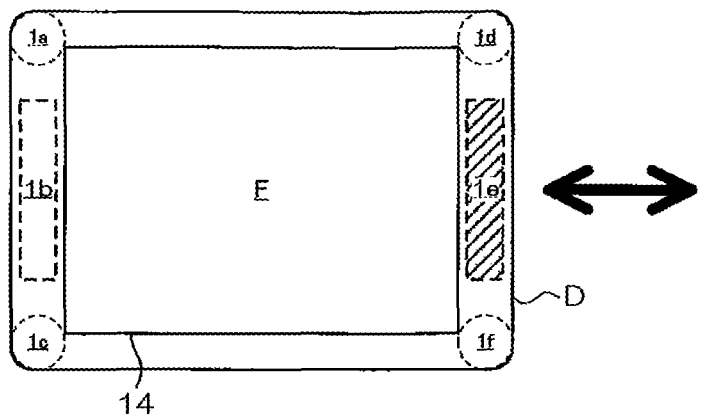
FIG. 8 is a diagram (I) showing modes of rotation or movement of the display unit according to the example.
Figure 8:
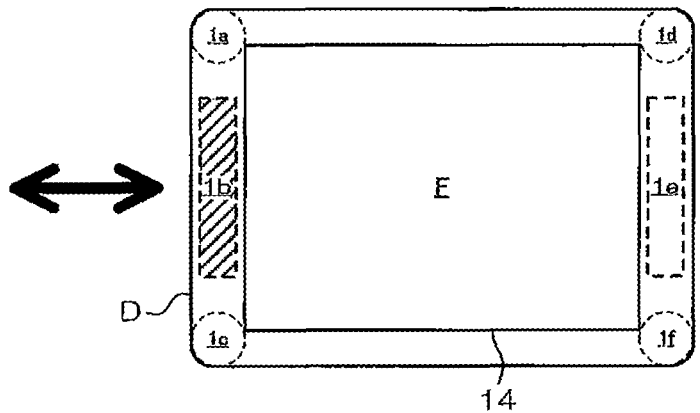
Figure 8:
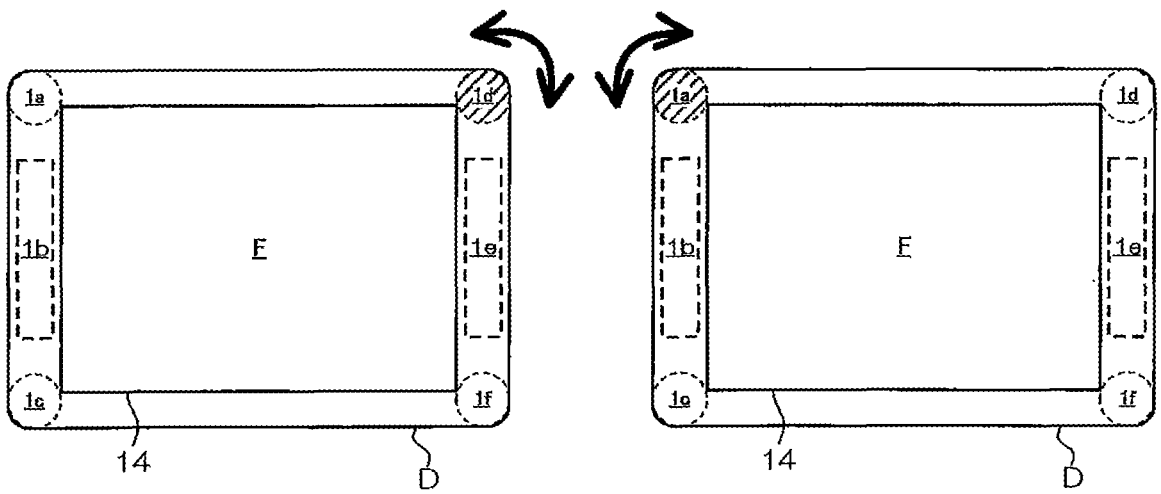
Figure 10:
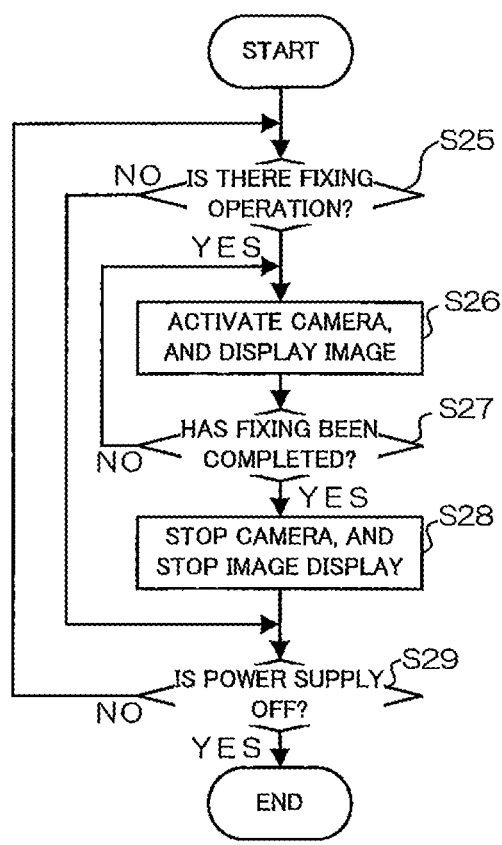
FIG. 10 is a flowchart showing a process when the display unit according to the example is fixed.

Meanwhile, FIG. 2 is a block diagram and the like showing a schematic configuration of a navigation apparatus according to the example. FIG. 3 is a perspective view in a case where the structure of part of the navigation apparatus is viewed from the upper left front. FIG. 4 shows six plan views of the exterior of a display unit according to the example. Further, FIG. 5 is a perspective view in a case where the back surface of the display unit according to the example is viewed from the upper left back. FIG. 6 is a schematic front view of example installation of the navigation apparatus according to the example. FIG. 7 is a flowchart showing rotation/movement control and the like of the display unit according to the example. Furthermore, FIGS. 8 and 9 are diagrams showing modes of rotation or movement of the display unit according to the example. FIG. 10 is a flowchart showing a process when the display unit according to the example is fixed. In this case, in FIG. 2, the components of the embodiment corresponding to the respective components in the control apparatus S according to the embodiment shown in FIG. 1 are denoted by the same component numbers as those denoting the respective components in the control apparatus S.

As shown in FIG. 2(a), a navigation apparatus NV according to the example comprises: a control unit 3 consisting of a CPU, a random access memory (RAM), a read only memory (ROM), and the like; an interface 10; a recording unit 11 consisting of a hard disc drive (HDD) or a solid state drive (SSD) or the like; an operation unit 12 consisting of operation buttons or a remote controller or the like to be operated by the user; a sensor unit 13 consisting of a global positioning system (GPS) or a self-standing position sensor or the like; a display unit D; a drive unit 15 that performs drive control on spatial (three-dimensional) movement and rotation of the display unit D; and an optical disk drive DK that reads and writes information on an optical disk (not shown) inserted into therein. In this case, the above-mentioned user is the driver or a passenger of the vehicle equipped with the navigation apparatus NV, for example. Further, the display unit D comprises a display surface F, a touch panel 14 provided on the front surface thereof, and a touch sensor group TS that will be described later. In this case, the display surface F of the display unit D is the display surface of a liquid crystal display forming the display unit D, for example. Meanwhile, the drive unit 15 is constructed by a drive 15a, a rotary motor 15b, an up-down slide motor 15c, a left-right slide motor 15d, and a front-back slide motor 15e. In this case, each of the later described touch sensors included in the touch sensor group TS and the touch panel 14 are equivalent to an example of the first detection unit 1 and an example of the second detection unit 2 according to the embodiment, respectively.

In the above configuration, the interface 10 obtains traffic jam information, weather information, and the like via an external network such as the Internet, for example, and outputs those pieces of information to the control unit 3. The recording unit 11 nonvolatilely records map data and the like to be used in a guidance process by the navigation apparatus NV, for example, and outputs the data to the control unit 3 as needed. The sensor unit 13 outputs, to the control unit 3, a result of detection performed by the above-mentioned position sensor to detect the current position of the vehicle on which the navigation apparatus NV is mounted, and outputs a result of detection of the speed, the traveling distance, the traveling direction, or the like, of the vehicle to the control unit 3. In a case where the above-mentioned user performs an instruction operation or the like on the navigation apparatus NV through the operation unit 12, the operation unit 12 generates an operation signal corresponding to the instruction operation, and outputs the operation signal to the control unit 3. In addition, using the traffic jam information and the like from the above-mentioned interface 10, the respective detection results from the above-mentioned sensor unit 13, and the map data and the like recorded in the above-mentioned recording unit 11, the control unit 3 performs the necessary guidance process as the navigation apparatus NV, and controls rotation and movement of the display unit D according to the example, in accordance with the operation signal from the above-mentioned operation unit 12. At this stage, the above-mentioned guidance process may be performed with additional use of map data, spot data, and the like recorded on the above-mentioned optical disk (not shown) inserted in the optical disk drive DK. Further, the map and the like necessary in the guidance process are displayed on the display surface F of the display unit D under the control of the control unit 3.

In addition to the above configuration, the recording unit 11 records beforehand pinching contact pattern data and gripping contact pattern data indicating a preset pinching contact pattern and a preset gripping contact pattern, respectively, for determining whether the later described "pinching operation" or "gripping operation" according to the example has been performed by the user. The recording unit 11 further records first threshold data and second threshold data indicating the later described first threshold and second threshold, respectively, with respect to the pressing force in a case where contact of the user with the display unit D at only one point has been detected. It should be noted that, in the description below, "contact" means contact of the above-mentioned user with a touch sensor or the like by fingers or a palm or the like.

Here, the pinching contact pattern is a preset pattern of contact that is the contact with the display unit D at one point on the front surface and at one point on the back surface and is equivalent to a pinching operation of the example to be performed by the user to pinch the display unit D, among patterns of contact of the user with the display unit D by fingers or the like. For example, the pinching contact pattern is a contact pattern in which the above-mentioned contact of a finger (a thumb, for example) of the user with the display unit D at one point on the front surface is detected, and the above-mentioned contact of two fingers (an index finger and a middle finger, for example) of the user with the display unit D on the back surface near the back side of the position on the front surface from which the contact has been detected is detected.

On the other hand, the above-mentioned gripping contact pattern is a preset pattern of contact that is the above-mentioned contact with the display unit D at two points at the right side and the left side on the front surface and at two points at the right side and the left side on the back surface, and is equivalent to a gripping operation of the example to be performed by the user to grab (or grip) the display unit D, among patterns of contact of the user with the display unit D by fingers or the like. More specifically, the gripping contact pattern is a contact pattern in which contact of fingers (both thumbs, for example) of the user with the display unit D at one point at either side on the front surface is detected, and contact of two or more fingers (an index finger, a middle finger, and a ring finger, for example) of the user with the display unit D at two points at either side on the back surface near the back side of the respective positions on the front surface from which the contact has been detected is detected. In this case, contact is detected at two points on the front surface of the display unit D, and contact is detected at a total of six points on the back surface.

Meanwhile, the above-mentioned first threshold is the pressing force threshold to be used in determining whether the display unit D is to be rotated or moved in a first direction equivalent to the direction of pressing force caused by contact, in a case where the contact of the user with the display unit D only at one point on the front surface or a side surface is detected, unlike contact having the above-mentioned pinching contact pattern or the above-mentioned gripping contact pattern. Further, the second threshold is the threshold to be used in determining whether the display unit D is to be rotated or moved in a second direction equivalent to the opposite direction from the direction of pressing force caused by contact, in a case where the contact by the user is detected in the same manner as with the first threshold. Furthermore, in the example, the above-mentioned first threshold is set to a value larger than the second threshold (that is, the first threshold>the second threshold). That is, in the navigation apparatus NV according to the example, in a case where contact by the user is detected only at one point on the front surface or a side surface of the above-mentioned display unit D, and the pressing force caused by the contact is equal to or greater than the above-mentioned first threshold, the control unit 3 rotates or moves the display unit D in the first direction. In a case where the pressing force is equal to or smaller than the above-mentioned second threshold, on the other hand, the control unit 3 rotates or moves the display unit D in the above-mentioned second direction. Further, in a case where the pressure is greater than the second threshold and smaller than the first threshold, the control unit 3 neither rotates nor moves the display unit D even if there is the above-mentioned contact by the user. In this case, the range of pressing force that is smaller than the first threshold and greater than the second threshold is regarded as a so-called dead zone, and the presence of this dead zone can prevent rotation or movement of the display unit D against the intention of the user due to inadvertent (or unintended) contact of the user with the display unit D only at one point.

It should be noted that the navigation apparatus NV may have a function of reproducing music data or the like recorded on the above-mentioned optical disk (not shown) or the recording unit 11, for example. In this case, the control unit 3 drives a speaker (not shown) to emit the sound of the music corresponding to the music data in the car, by reading, from the above-mentioned optical disk or the recording unit 11, the music data corresponding to the music designated through the operation unit 12, for example, and reproducing the music data. In doing so, the control unit 3 can also emit the sound while causing the above-mentioned display surface F to display an image or the like corresponding to the music.

Meanwhile, the display unit D having the display surface F according to the example has such a shape that the thin display unit D protrudes inward from the console unit of the vehicle, on which the navigation apparatus NV is mounted, via a joining arm not shown in FIG. 2. The drive unit 15 then controls rotation of the entire display unit D comprising the above-mentioned display and the like, and controls the position of the display unit D in the space in front of the above-mentioned console unit. More specifically, the rotary motor 15b of the drive unit 15 rotates the entire display unit D in the plane in which the display surface F is included, in that space. The up-down slide motor 15c of the drive unit 15 causes the entire display unit D to slide up and down, as viewed from the user, in the plane including the display surface F (see the upward and downward arrows in FIG. 3), also in that space. Further, the left-right slide motor 15d of the drive unit 15 causes the entire display unit D to slide to right and left, as viewed from the user, in the plane including the display surface F (see the rightward and leftward arrows in FIG. 3) in that space. Furthermore, the front-back slide motor 15e of the drive unit 15 causes the entire display unit D to slide in a front-back (depth) direction as viewed from the user (see the forward and backward arrows in FIG. 3) in that space. Under the control of the control unit 3, the drive 15a then drives the rotary motor 15b, the up-down slide motor 15c, the left-right slide motor 15d, and the front-back slide motor 15e.

Next, a schematic configuration of the display unit D according to the example is described with reference to FIG. 2(b).

As shown in FIG. 2(b), the display unit D according to the example comprises: the above-mentioned display having the above-mentioned display surface F comprising the above-mentioned touch panel 14 in the front surface thereof; the above-mentioned touch sensor group TS designed to be capable of detecting contact with the surfaces of the display unit D; a camera 16 provided on the back surface of the display unit D; a fixing unit 17; a fixing control unit 18; and a display control unit 19.

In this configuration, the touch sensor group TS is constructed by a plurality of touch sensors provided on the surfaces of the above-mentioned display unit D (more specifically, the peripheral portion of the front surface of the display unit D other than the display surface F, the upper, lower, right, and left side surface portions of the display unit D, and the back surface of the display unit D). Each of these touch sensors respectively detects the presence/absence of contact with the touch sensor by the user's finger or palm, and the pressing force caused by the contact. Each touch sensor then respectively generates contact information including pressure information indicating the value of the detected pressing force, and outputs the contact information to the control unit 3. In addition to that, each touch sensor detects a change in the detected pressing force, generates change information indicating the change, and outputs the change information to the control unit 3. The change in the pressing force in this case includes a change in the position at which the pressing force in the contact region of the touch sensor is detected, and a change in the magnitude of the pressing force at the same contact position. In this case, the change in the position at which the pressing force is detected is caused by movement of the finger or the palm while the contact with the touch sensor is maintained (in other words, the above-mentioned finger or the palm sliding on the touch sensor).

Meanwhile, the fixing unit 17 is a fixing unit that fixes the display unit D physically (mechanically) to the above-mentioned joining arm. Under the control of the fixing control unit 18, the fixing unit 17 physically (mechanically) fixes the display unit D to the above-mentioned joining arm, and allows the display unit D to be detached from the joining arm to which the display unit D is fixed. The display unit D detached from the joining arm is in such a state that the display unit D can be carried by the above-mentioned user. This fixing of the display unit D to the above-mentioned joining arm by the fixing unit 17, and the transition to the state in which the display unit D can be detached from the joining arm will be described later in detail.

On the other hand, the camera 16 sets the range in which the camera 16 faces the back surface of the display unit D (in other words, the range of the direction of a perpendicular line on the back surface) as its imaging range, and outputs image information obtained by imaging the imaging range, to the display control unit 19. The camera 16 is constructed by a charge coupled device (CCD), a complementary metal oxide semiconductor (CMOS) imaging device, or the like, for example. In accordance with the later described user operation performed on each of the touch sensors included in the touch sensor group TS or the touch panel 14, the display control unit 19 then displays, on the display surface F, an image corresponding to the image information output from the camera 16. This display of the image by the display control unit 19 will also be described later in detail.

Next, the drive unit 15 according to the example, and the display unit D having its spatial position and rotation subjected to drive control to be performed by the drive unit 15 are described more specifically with reference to FIGS. 3 through 5.

First, as shown in FIG. 3, in the drive unit 15 according to the example, the above-mentioned display unit D according to the example is supported, via the joining arm 20, with respect to a housing CK that houses the above-mentioned drive 15a, the above-mentioned rotary motor 15b, the above-mentioned up-down slide motor 15c, the above-mentioned left-right slide motor 15d, the front-back slide motor 15e, and the like. Here, the height and/or the width of the display unit D may be greater than the height and/or the width of the drive unit 15. Further, in the case illustrated in FIG. 3, the above-mentioned optical disk drive DK is also housed at a lower portion in the housing CK. The housing CK is an example of the "support unit" according to the present application, and the joining arm 20 is an example of the "joining unit" according to the present application.

In addition, the display unit D comprises the above-mentioned display surface F with the above-mentioned touch panel 14 disposed in the front surface, and the touch sensor group TS including a touch sensor 1a and the like described later with reference to FIG. 4 in its surfaces. It should be noted that, in the case illustrated in FIG. 3, the "front surface" is the surface in a direction in which the display unit D is viewed from the drive unit 15. Further, in FIG. 3, the touch sensor group TS is not shown, for ease of explanation. It should be noted that, in the example illustrated in FIG. 3, the display unit D is in a horizontal usage state (long in a horizontal direction), but the display unit D may be put into a vertical usage state (long in a vertical direction) through rotation of the display unit D about the central axis of the joining arm 20. Information such as the above-mentioned map is then displayed on the screen of the display unit D so as to be easily viewed, depending on whether the display unit D is in a horizontal usage state or a vertical usage state.

Further, the touch panel 14 disposed in the front surface of the display surface F has a function of transmitting the display on the display surface F, and a position input function. The position input function in this case is realized with a device of an electrostatic capacitance type, a resistive film type, or the like, for example. In addition to that, the touch panel 14 detects the presence/absence or the like of contact with the above-mentioned display surface F, like the touch sensor group TS. In this regard, the presence/absence of the above-mentioned contact and the pressing force at that time can be detected in a case where the touch panel 14 is formed with a device of a resistive film type. In a case where the touch panel 14 is formed with a device of an electrostatic capacitance type, on the other hand, it is possible not only to detect the above-mentioned contact or the like, but also to determine whether the above-mentioned finger, the palm, or the like is in the proximity of the touch panel 14 (without contact). It should be noted that, in the case where proximity is to be detected, the above-mentioned pressing force is not detected.

Next, as shown in FIG. 3, the housing CK houses: an up-down slide stage 21 that supports the joining arm 20 fixed to the center of the back surface of the display unit D, and includes the rotary motor 15b and the up-down slide motor 15c shown in FIG. 2(a); a left-right slide stage 23 and a left-right slide stage 24 that sandwich an up-down guide 22 inserted into a guide hole penetrating through the up-down slide stage 21, and includes the left-right slide motor 15d shown in FIG. 2(a); a front-back slide stage 25 that includes the front-back slide motor 15e shown in FIG. 2(a) and has guide grooves 25a; a front-back guide 26 and a front-back guide 27 having guide grooves 27a in the respective inside surfaces facing each other, and are fixed to the housing CK; and the optical disk drive DK.

In this structure, the joining arm 20 has a cylindrical shape or the like, for example. In addition, part of the joining arm 20 is exposed toward the front of the drive unit 15 through a hole HL circularly formed in the front face of the housing CK. The end of the exposed portion of the joining arm 20 is then fixed substantially perpendicularly to the display unit D near the center of the back surface of the display unit D.

Meanwhile, the up-down slide stage 21 supports the joining arm 20 in a manner such that the joining arm 20 (in other words, the display unit D) can rotate about its central axis as the rotation axis. The above-mentioned rotary motor 15b included in the up-down slide stage 21 rotates the joining arm 20. Thus, in the space in front of the above-mentioned console unit, the entire display unit D is rotated clockwise or counterclockwise in the plane including the display surface F.

Next, the left-right slide stage 23 and the left-right slide stage 24 support the up-down slide stage 21 in a manner such that the up-down slide stage 21 can move up and down along the up-down guide 22. In addition, the above-mentioned up-down slide motor 15c included in the up-down slide stage 21 moves the up-down slide stage 21 along the up-down guide 22 relative to the left-right slide stage 23 and the left-right slide stage 24, so that the entire display unit D slides up and down, as viewed from the user, in the plane including the display surface F in the above-mentioned space. As a result, as shown in FIG. 3, the cooperating arm 20 and the display unit D are made to slide in a vertical direction, as viewed from the user. At this point of time, the joining arm 20 is made to slide vertically, together with the display unit D, through the hole HL in the front face of the housing CK.

On the other hand, the front-back slide stage 25 supports the left-right slide stage 23 and the left-right slide stage 24 in a manner such that the left-right slide stage 23 and the left-right slide stage 24 can move horizontally along the guide grooves 25a. The left-right slide motor 15d included in the left-right slide stage 23 and the left-right slide stage 24 moves the left-right slide stage 23 and the left-right slide stage 24 along the guide grooves 25a relative to the front-back slide stage 25, so that the entire display unit D slides horizontally, as viewed from the user, in the plane including the display surface F in the above-mentioned space. As a result, as shown in FIG. 3, the up-down slide stage 21, the joining arm 20, and the display unit D are made to slide in a horizontal direction, as viewed from the user. At this time, the joining arm 20 is made to slide horizontally, together with the display unit D, through the hole HL in the front face of the housing CK.

It should be noted that, as the up-down slide motor 15c in the up-down slide stage 21 and the left-right slide motor 15d in the left-right slide stage 23 and the left-right slide stage 24 are simultaneously driven, the joining arm 20 and the display unit D can be made to slide in an oblique direction.

Next, the front-back guide 26 and the front-back guide 27 support the front-back slide stage 25 in a manner such that the front-back slide stage 25 can move in a front-back direction (depth direction). The front-back slide motor 15e included in the front-back slide stage 25 moves the front-back slide stage 25 in a depth direction along the respective guide grooves 27a relative to the front-back guide 26 and the front-back guide 27, so that the entire display unit D is made to slide in a depth direction, as viewed from the user, in the above-mentioned space. As a result, as shown in FIG. 3, the front-back slide stage 25, the left-right slide stage 23, the left-right slide stage 24, the up-down slide stage 21, the joining arm 20, and the display unit D are made to slide in a depth direction as viewed from the user.

Lastly, the optical disk drive DK reads out the above-mentioned map data and the like recorded on a conventional optical disk (such as a digital versatile disc (DVD) or a compact disc (CD), for example), and outputs the data to the control unit 3. The optical disk in this case can be inserted into the optical disk drive DK from an insertion slot SL formed in the front face of the housing CK.

Next, particularly the structure of the touch sensor group TS in the display unit D according to the example, is described with reference to FIG. 4.

As mentioned above, the touch sensor group TS according to the example is constructed by a plurality of touch sensors provided on the peripheral portion of the front surface of the display unit D other than the display surface F, the upper, lower, right, and left side surface portions of the display unit D, and the peripheral portion of the back surface of the display unit D. As mentioned above, each of these touch sensors detects the presence/absence of contact with the touch sensor by the user's finger or palm, the pressing force caused by the contact, a change in the pressing force, and outputs the respective detection results to the control unit 3.

First, as shown in FIG. 4(a) as a front view of the display unit D, a touch sensor 1a and a touch sensor 1c are provided at both ends of the left rim portion outside the display surface F on the front surface of the display unit D, and a touch sensor 1b is provided in the longitudinal direction at the central portion of the left rim portion. It should be noted that the joining arm 20 fixed to the back surface of the display unit D is omitted in FIG. 4. Further, a touch sensor 1d and a touch sensor 1f are provided at both ends of the right rim portion outside the display surface F on the front surface of the display unit D, and a touch sensor 1e is provided in the longitudinal direction at the central portion of the right rim portion. On the other hand, as shown in FIG. 4(b) as a back view of the display unit D, a touch sensor 2a and a touch sensor 2c are provided at both ends of the outer right rim portion of the back surface of the display unit D comprising the above-mentioned camera 16, and a touch sensor 2b is provided in the longitudinal direction at the central portion of the outer right rim portion. Further, a touch sensor 2d and a touch sensor 2f are provided at both ends of the outer left rim portion of the back surface of the display unit D, and a touch sensor 2e is provided in the longitudinal direction at the central portion of the outer left rim portion. With the above arrangement of the touch sensors 1a through 1f (the front surface of display unit D) and arrangement of the touch sensors 2a through 2f (the back surface of display unit D), when contact is detected by touch sensors (the touch sensor 1a and the touch sensor 2a, for example) disposed at the corresponding positions on the front surface and the back surface of the display unit D, the above-mentioned pinching operation is being performed by the user at the corresponding positions on the display unit D.

Meanwhile, as shown in FIG. 4(c) as a top view of the display unit D, a touch sensor 3a and a touch sensor 3c are provided at both sides of the upper surface of the display unit D, and a touch sensor 3b is provided at the central portion of the upper surface. Further, as shown in FIG. 4(d) as a bottom view of the display unit D, a touch sensor 4a and a touch sensor 4c are provided at both sides of the lower surface of the display unit D, and a touch sensor 4b is provided at the central portion of the lower surface. Further, as shown in FIG. 4(e) as a left side view of the display unit D, a touch sensor 5a and a touch sensor 5c are provided at both sides of the left side surface of the display unit D, and a touch sensor 5b is provided at the central portion of the left side surface. Furthermore, as shown in FIG. 4(f) as a right side view of the display unit D, a touch sensor 6a and a touch sensor 6c are provided at both sides of the right side surface of the display unit D, and a touch sensor 6b is provided at the central portion of the right side surface.

Further, in addition to these touch sensors 1a through 6f, the touch panel 14 itself also has a function as a touch sensor according to the example. In this case, a touch operation as the above-mentioned position input function is also performed on the touch panel 14. In addition, such a touch operation and contact according to the example need to be distinguished from each other. For this reason, in an example case where there is contact of a larger area (such as the area of a palm, for example) than the area of contact made with a finger tip or a touch pen that is used in the above-mentioned touch operation, the control unit 3 determines that contact according to the example has been performed on the touch panel 14. In addition, in a case where contact of the above-mentioned large area with the touch panel 14 has been detected, the control unit 3 determines that the contact is contact by the user according to the example, and controls the position of the entire display unit D.

Next, the structure and the functions of the fixing unit 17 according to the example provided on the back surface of the display unit D is described with reference to FIG. 5. It should be noted that, for ease of explanation, the touch sensor 2a and the like on the back surface and the side surfaces of the display unit D, and the protective cover of the fixing unit 17 are omitted in FIG. 5. As mentioned above, the fixing unit 17 according to the example is a fixing unit that physically (mechanically) fixes the display unit D to the joining arm 20. In addition, under the control of the fixing control unit 18, the fixing unit 17 mechanically fixes the display unit D to the joining arm 20, and makes the display unit D detachable from the joining arm 20 to which the display unit D is fixed.

That is, as shown in FIG. 5, a receiving portion 20a shaped to fit into a recess 40 formed in the center of the back surface of the display unit D is fixed to the end of the joining arm 20 on the opposite side from the housing CK. In the receiving portion 20a, two through holes 20b and 20c are provided in parallel in the horizontal direction from the receiving portion 20a toward the display unit D when the receiving portion 20a is fit into the recess 40.

On the other hand, in a moving member 30 of the fixing unit 17, guide holes 30a and 30b are formed. Guide pins 31 and 32 that are fixed at upper and lower portions near the left side of the recess 40 in a direction toward the back surface of the display unit D penetrate through the guide holes 30a and 30b, respectively. At the opposite end of the guide pins 31 and 32 from the end at which the guide pins 31 and 32 are fixed to the display unit D, a plate-like fastening portion for guiding the moving member 30 to move horizontally is formed. Further, parallel fixing rods 30d and 30e that are inserted into the through holes 20b and 20c from the left side toward the display unit D when the display unit D is fixed to the joining arm 20 are integrally formed at the position of the moving member 30 corresponding to the positions of the through holes 20b and 20c at the time of the fixing. Further, a rack 30c is integrally formed at an upper portion of the moving member 30. On the other hand, above the moving member 30 on the back surface of the display unit D in FIG. 5, a pinion 34 to be engaged with the above-mentioned rack 30c is fixed to its rotating shaft, and a fixing motor 33 of the fixing unit 17 is also fixed. When the fixing motor 33 is driven under the control of the fixing control unit 18 while the pinion 34 is engaged with the rack 30c, the moving member 30 moves horizontally along the guide holes 30a and 30b by virtue of rotation of the pinion 34. In this case, when the moving member 30 is moved to the right in FIG. 5 while the receiving portion 20a is fit in the recess 40, the above-mentioned fixing rods 30d and 30e are inserted from the left into the through holes 20b and 20c of the receiving portion 20a, respectively. Thus, the display unit D is fixed to the joining arm 20 via the receiving portion 20a.

Meanwhile, in a moving member 35 of the fixing unit 17, guide holes 35a and 35b are formed. Guide pins 36 and 37 that are fixed at upper and lower portions near the right side of the recess 40 in a direction toward the back surface of the display unit D penetrate through the guide holes 35a and 35b, respectively. At the opposite end of the guide pins 36 and 37 from the end at which the guide pins 36 and 37 are fixed to the display unit D, a plate-like fastening portion for guiding the moving member 35 to move horizontally is formed. Further, parallel fixing rods 35d and 35e that are inserted into the above-mentioned through holes 20b and 20c from the right side toward the display unit D at the above-mentioned time of fixing are integrally formed at the position of the moving member 35 corresponding to the positions of the through holes 20b and 20c at the time of the fixing. Further, a rack 35c is integrally formed at an upper portion of the moving member 35. On the other hand, above the moving member 35 on the back surface of the display unit D in FIG. 5, a pinion 39 to be engaged with the above-mentioned rack 35c is fixed to its rotating shaft, and a fixing motor 38 of the fixing unit 17 is also fixed. When the fixing motor 38 is driven under the control of the fixing control unit 18 while the pinion 39 is engaged with the rack 35c, the moving member 35 moves horizontally along the guide holes 35a and 35b by virtue of rotation of the pinion 39. In this case, when the moving member 35 is moved to the left in FIG. 5 while the receiving portion 20a is fit in the recess 40, the fixing rods 35d and 35e are inserted from the right into the through holes 20b and 20c of the receiving portion 20a, respectively. As a result, in conjunction with movement of the moving member 30 on the opposite side of the recess 40, the display unit D is fixed to the joining arm 20 via the receiving portion 20a.

It should be noted that, in a state where the display unit D is fixed to the joining arm 20 via the receiving portion 20a by the fixing unit 17, when the fixing motor 33 and the fixing motor 38 are driven to rotate in the opposite direction from that at the time of the fixing under the control of the fixing control unit 18, the moving member 30 is moved to the left in FIG. 5 along the guide holes 30a and 30b, and, at the same time, the moving member 35 is moved to the right in FIG. 5 along the guide holes 35a and 35b. Thus, as the fixing rods 30d and 30e, and the fixing rods 35d and 35e are removed from the through holes 20b and 20c of the receiving portion 20a to the left or right in FIG. 5, the display unit D is made detachable from the joining arm 30.

Next, a mode of attachment of the navigation apparatus NV including the drive unit 15 (including the optical disk drive DK) and the display unit D (see FIG. 3) to the console unit of the vehicle equipped with the navigation apparatus NV according to the example is described with reference to FIG. 6.

As shown in FIG. 6, the navigation apparatus NV according to the example is mounted on a central region 50 of the above-mentioned console unit. An opening 51 for attachment of the navigation apparatus NV and the like is formed in the central region 50 of the console unit. As the drive unit 15 and the like of the navigation apparatus NV are inserted into and fixed in the console unit via the opening 51, the navigation apparatus NV is fixed to the console unit.

In this case, for example, a hazard switch 52, a clock display 53, an air conditioner switch 54, a temperature meter display 55, a wind speed adjustment dial 56, a temperature adjustment dial 57, an air outlet selection dial 58, an outer/inner air switch 59, and the like are provided on the central region 50 of the console unit. Of these components, the hazard switch 52 is a switch for blinking and turning off a hazard lamp mounted on the vehicle. The clock display 53 has a display, and displays the current time. The temperature display 55 has a display, and displays a result of detection of the temperature in the vehicle. Each of from the air conditioner switch 54 to the outer/inner air switch 59 is an operation unit for controlling operation of the air conditioner mounted on the vehicle. The kinds of operation units provided in the central region 50 of the console unit, the kinds of information displayed by devices provided in the central region 50, and the like generally vary depending on the model of the vehicle and the model year of the vehicle. Further, the arrangement of the opening 51, the operation units, and the devices in the central region 50 of the console unit also normally varies depending on the model of the vehicle and the model year of the vehicle. In addition, as shown in the example illustrated in FIG. 6, the height and the width of the display unit D according to the example are greater than the height and the width of the drive unit 15 and the opening 51. Therefore, depending on the position of the display unit D relative to the drive unit 15 and whether the display unit D is in a vertical orientation or in a horizontal orientation, at least one of the operation units from the hazard switch 52 to the outer/inner air switch 59 on the central region 50 is hidden behind the display unit D in some cases. Alternatively, the insertion slot SL of the optical disk drive DK is hidden behind the display unit D in some cases. Therefore, when the display unit D is moved or rotated by the drive unit 15 according to the example, the portion hidden behind the display unit D becomes visible from the user. Similarly, an operation can also be performed for a component hidden behind the display unit D among the components from the hazard switch 52 to the outer/inner air switch 59 and the insertion slot SL.

Next, control of rotation or movement of the display unit D according to the example, which is to be performed under the control of the control unit 3 by the drive unit 15 according to the example comprising the configuration mentioned above, is collectively described with reference to FIGS. 7 through 9. It should be noted that, in the following description using FIGS. 7 through 9, the display unit D is fixed to the joining arm 20 by the fixing unit 17. Further, the control of rotation or movement shown in FIG. 7 may be started as part of the guidance process to be performed by the navigation apparatus NV, such as time-division interrupt processing at regular intervals.

As shown in FIG. 7, in controlling rotation or movement of the display unit D according to the example, the control unit 3 monitors detection of contact according to the example by the user, at any of the touch sensors 1a through 6f and the touch panel 14 provided on the surfaces of the display unit D (step S1, and step S2). In a case where the contact is not detected at any of the touch sensor 1a and the others in the monitoring in step S1 and step S2 (step S2: NO), the control unit 3 returns to the original guidance process.

In a case where the above-mentioned contact is detected at some of the touch sensor 1a and the others in the monitoring in step S1 and step S2 (step S2: YES), on the other hand, the control unit 3 then determines whether the above-mentioned contact is detected at the two touch sensors 1a and the like (the touch sensor 1a and the touch sensor 2a, for example) located at the corresponding positions on the front surface and the back surface of the display unit D (step S3). In the determination in step S3, in a case where the above-mentioned contact is not detected at the two touch sensors 1a and the like located at the corresponding positions on the front surface and the back surface of the display unit D (step S3: NO), the control unit 3 moves on to determination in step S11, which will be described later. In the determination in step S3, in a case where the above-mentioned contact is detected at the two touch sensors 1a and the like located at the corresponding positions on the front surface and the back surface of the display unit D (step S3: YES), on the other hand, the control unit 3 then determines whether the contact pattern on the front surface and the back surface is the above-mentioned pinching contact pattern (step S4). In the determination in step S4, the control unit 3 reads out the above-mentioned pinching contact pattern data from the recording unit 11 when the result is determined to be "YES" in the determination in step S3, and compares the pinching contact pattern data with the contact pattern detected at that point of time (see step S3: YES).

In the determination in step S4, in a case where the contact pattern detected in step S3 is not the above-mentioned pinching contact pattern (step S4: NO), the control unit 3 returns to the original guidance process. In the determination in step S4, in a case where the contact pattern detected in step S3 is the above-mentioned pinching contact pattern (step S4: YES), on the other hand, the control unit 3 then determines whether there is a difference equal to or larger than a preset threshold, for example, between the pressing force of the contact with the front surface of the display unit D and the pressing force of the contact with the back surface of the display unit D at the corresponding position (step S5). Here, the preset threshold is a threshold with which it is possible to prevent the result of the determination in step S5 from becoming "YES" in a case where the contact having the above-mentioned pinching contact pattern is due to an erroneous operation. More specifically, the threshold is set beforehand experimentally or empirically, for example. In the determination in step S5, in a case where there is a difference equal to or larger than the above-mentioned preset threshold between the pressing force of the contact with the front surface of the display unit D and the pressing force of the contact with the back surface of the display unit D at the corresponding position (step S5: YES), the control unit 3 determines that the contact with the front surface and the back surface of the display unit D according to the pinching contact pattern is based on the intention of the user, which is to move the display unit D forward or backward as viewed from the user, and controls the drive unit 15 to move the display unit D in the direction of the surface opposite from the surface of the display unit D from which the contact with the greater pressing force has been detected (step S6). In step S6, in a case where the pressing force of the contact with the front surface of the display unit D is greater than the pressing force of the contact with the back surface of the display unit D at the corresponding position, the control unit 3 controls the drive unit 15 to move the display unit D backward as viewed from the user (or in the direction toward the drive unit 15 (the console unit)). In a case where the pressing force of the contact with the front surface of the display unit D is smaller than the pressing force of the contact with the back surface of the display unit D at the corresponding position, on the other hand, the control unit 3 controls the drive unit 15 to move the display unit D forward as viewed from the user (or in the direction away from the drive unit 15 (the console unit)).

After that, the control unit 3 determines whether to stop the movement in step S6 (step S7). At this time, the control unit 3 determines to stop the movement in step S6, in a case where one side of the contact having the above-mentioned pinching contact pattern (either the contact with the front surface of the display unit D or the contact with the back surface of the display unit D) is no longer detected. In a case where the contact having the above-mentioned pinching contact pattern is continuously detected, on the other hand, the control unit 3 determines that the movement in step S6 should be continued. In a case where it is determined in step S7 that the movement in step S6 should be continued (step S7: CONTINUE), the control unit 3 returns to the above-mentioned step S5, and repeats the above-mentioned control in step S5 and the subsequent steps. In a case where it is determined in step S7 that the movement in step S6 should be stopped (step S7: STOP), on the other hand, the control unit 3 stops the movement of the display unit D, and returns to the original guidance process.

In the determination in the above-mentioned step S5, in a case where there is no difference equal to or larger than the above-mentioned preset threshold between the pressing force of the contact with the front surface of the display unit D and the pressing force of the contact with the back surface of the display unit D at the corresponding position, that is, in a case where the pressing force of the contact with the front surface of the display unit D is equal to the pressing force of the contact with the back surface of the display unit D at the corresponding position (step S5: NO), on the other hand, the control unit 3 then checks the positions of the touch sensor 1a and the other(s), at which the contact having the above-mentioned pinching contact pattern has been detected in step S4, on the display unit D (step S8), and detects the pressing direction of the contact from the changes in the positions at which the pressing forces have been detected, the changes representing changes in the pressing forces of the contact (step S9).

Here, in the above-mentioned step S8, in a case where contact having the pinching contact pattern has been detected at the touch sensor 1e and the touch sensor 2e located on the back surface on the back side of the touch sensor 1e, for example, the control unit 3 determines that contact having the pinching contact pattern in which the pressing forces are equal (that is, there is no difference equal to or larger than the above-mentioned preset threshold, and the same applies in the description below) has been detected at the outer right rim portion in the front view in FIG. 4(a). In a case where contact having the pinching contact pattern has been detected at the touch sensor 1a and the touch sensor 2a located on the back surface on the back side of the touch sensor 1a, for example, the control unit 3 determines that contact having the pinching contact pattern in which the pressing forces are equal has been detected at the upper left edge portion in the front view in FIG. 4(a).

In step S9, on the other hand, in a case where contact having the pinching contact pattern has been detected at the touch sensor 1e and the touch sensor 2e located on the back surface on the back side of the touch sensor 1e, for example, the control unit 3 detects the changes in the positions at which the respective pressing forces at the touch sensor 1e and the touch sensor 2e have been detected, as the respective pressing direction of each contact. Further, in a case where contact having the pinching contact pattern has been detected at the touch sensor 1a and the touch sensor 2a located on the back surface on the back side of the touch sensor 1a, for example, the control unit 3 detects the changes in the positions at which the respective pressing forces at the touch sensor 1a and the touch sensor 2a have been detected, as the pressing direction of each contact.

The control unit 3 then controls the drive unit 15 to rotate the display unit D, move the display unit D leftward or rightward as viewed from the front, or move the display unit D upward or downward as viewed from the front, in accordance with the contact positions on the display unit D checked in step S8 and the pressing direction detected in step S9 (step S10).

After that, the control unit 3 determines whether to stop the movement in step S10 (step S7). At this time, the control unit 3 determines that the rotation or movement in step S10 should be stopped in a case where one side of the above-mentioned contact having the pinching contact pattern is no longer detected, as in the above-mentioned case of step S7 after step S6. In a case where the contact having the above-mentioned pinching contact pattern is continued, on the other hand, the control unit 3 determines that the rotation or movement in step S10 should be continued. In a case where it is determined in step S7 that the rotation or movement in step S10 should be continued (step S7: CONTINUE), the control unit 3 returns to step S5, and repeats the above-mentioned control in step S5 and the subsequent steps. In a case where it is determined in step S7 that the rotation or movement in step S10 should be stopped (step S7: STOP), on the other hand, the control unit 3 stops the movement of the display unit D, and returns to the original guidance process.

As a result of the above control performed in step S5 and in steps S8 through S10, in a case where contact having the pinching contact pattern in which the pressing forces are equal has been confirmed at the outer right rim portion in the front view in FIG. 4(a) (see step S8), and the pressing direction of the contact is a rightward direction in the front view in FIG. 4(a) (in other words in a case where an operation of pinching and pulling the outer right rim portion in an outward direction is performed), for example, the control unit 3 controls the drive unit 15 to move the display unit D rightward as viewed from the front, as shown in an example illustrated in FIG. 8(a). Further, likewise, in a case where contact having the pinching contact pattern in which the pressing forces are equal has been detected at the outer right rim portion in the front view in FIG. 4(a) (see step S8), and the pressing direction of the contact is a leftward direction in the front view in FIG. 4(a) (in other words, in a case where an operation of pinching and pushing the outer right rim portion toward the center of the display unit D is performed), the control unit 3 controls the drive unit 15 to move the display unit D leftward as viewed from the front, as shown in the example illustrated in FIG. 8(a). Further, in a case where contact having the pinching contact pattern in which the pressing forces are equal has been confirmed at the outer left rim portion in the front view in FIG. 4(a) (see step S8) as a result of detection of contact having the pinching contact pattern at the touch sensor 1b and the touch sensor 2b located on the back surface on the back side of the touch sensor 1b, for example, and the pressing direction of the contact is a rightward direction in the front view in FIG. 4(a) (in other words, in a case where an operation of pinching and pushing the outer left rim portion toward the center of the display unit D is performed), the control unit 3 controls the drive unit 15 to move the display unit D rightward as viewed from the front, as shown in an example illustrated in FIG. 8(b). Further, likewise, in a case where contact having the pinching contact pattern in which the pressing forces are equal has been detected at the outer left rim portion in the front view in FIG. 4(a) (see step S8), and the pressing direction of the contact is a leftward direction in the front view in FIG. 4(a) (in other words, in a case where an operation of pinching and pulling the outer left rim portion in an outward direction is performed), the control unit 3 controls the drive unit 15 to move the display unit D leftward as viewed from the front, as shown in the example illustrated in FIG. 8(b).

Furthermore, in a case where contact having the pinching contact pattern in which the pressing forces are equal has been confirmed at the upper right edge portion in the front view in FIG. 4(a) (see step S8) as a result of detection of contact having the pinching contact pattern at the touch sensor 1d and the touch sensor 2d located on the back surface on the back side of the touch sensor 1d, for example, and the pressing direction of the contact is a counterclockwise direction or an upward and leftward direction in the front view in FIG. 4(a) (in other words, in a case where an operation of pinching the upper right edge portion and rotating the display unit D in a counterclockwise direction is performed), the control unit 3 controls the drive unit 15 to rotate the display unit D counterclockwise as viewed from the front, as shown in an example illustrated in FIG. 8(c). Further, likewise, in a case where contact having the pinching contact pattern in which the pressing forces are equal has been confirmed at the upper right edge portion in the front view in FIG. 4(a) (see step S8), and the pressing direction of the contact is a clockwise direction or a downward and rightward direction in the front view in FIG. 4(a) (in other words, in a case where an operation of pinching the upper right edge portion and rotating the display unit D in a clockwise direction is performed), the control unit 3 controls the drive unit 15 to rotate the display unit D clockwise as viewed from the front, as shown in the example illustrated in FIG. 8(c). Further, in a case where contact having the pinching contact pattern in which the pressing forces are equal has been confirmed at the upper left edge portion in the front view in FIG. 4(a) (see step S8) as a result of detection of contact having the pinching contact pattern at the touch sensor 1a and the touch sensor 2a located on the back surface on the back side of the touch sensor 1a, for example, and the pressing direction of the contact is a counterclockwise direction or a downward and leftward direction in the front view in FIG. 4(a) (in other words, in a case where an operation of pinching the upper left edge portion and rotating the display unit D in a counterclockwise direction is performed), the control unit 3 controls the drive unit 15 to rotate the display unit D counterclockwise as viewed from the front, as shown in an example illustrated in FIG. 8(d). Further, likewise, in a case where contact having the pinching contact pattern in which the pressing forces are equal has been confirmed at the upper left edge portion in the front view in FIG. 4(a) (see step S8), and the pressing direction of the contact is a clockwise direction or an upward and rightward direction in the front view in FIG. 4(a) (in other words, in a case where an operation of pinching the upper left edge portion and rotating the display unit D in a clockwise direction is performed), the control unit 3 controls the drive unit 15 to rotate the display unit D clockwise as viewed from the front, as shown in the example illustrated in FIG. 8(d).

In the determination in step S3 mentioned above, in a case where the contact is not detected at the two touch sensors 1a and the like located at the corresponding positions on the front surface and the back surface of the display unit D (step S3: NO), on the other hand, the control unit 3 then determines whether the above-mentioned contact is detected only at one point of the touch sensors 3a through 6c provided on the (outer peripheral) side surface portions of the display unit D or the touch panel 14 (step S11). In the determination in step S11, in a case where the above-mentioned contact is not detected at any of the touch sensors 3a through 6c and the touch panel 14 (step S11: NO), the control unit 3 moves on to determination in step S18, which will be described later. In the determination in step S11, in a case where the above-mentioned contact is detected at one point of the touch sensors 3a through 6c or the touch panel 14 (step S11: YES), on the other hand, the control unit 3 detects the pressing force of the contact via the touch panel 3a or the like at which the contact has been detected (step S12). The control unit 3 then determines whether the pressing force detected in step S12 is equal to or greater than the above-mentioned first threshold (step S13). In a case where the pressing force detected in step S12 is equal to or greater than the first threshold in the determination in step S13 (step S13: YES), the control unit 3 controls the drive unit 15 to rotate or move the display unit D in the first direction corresponding to the pressing force equal to or greater than the above-mentioned first threshold with respect to the touch sensor 3a or the like at which the contact at above-mentioned one point has been detected (step S14). After that, the control unit 3 determines whether to stop the rotation or movement in step S14 (step S15). At this time, in a case where the contact at above-mentioned one point is no longer detected, the control unit 3 determines that the rotation or movement in step S14 should be stopped. In a case where the contact at above-mentioned one point is continuously detected, on the other hand, the control unit 3 determines that the rotation or movement in step S14 should be continued. In a case where it is determined in step S15 that the rotation or movement in step S14 should be continued (step S15: CONTINUE), the control unit 3 returns to step S12, and repeats the above-mentioned control in step S12 and the subsequent steps. In a case where it is determined in step S15 that the rotation or movement in step S14 should be stopped (step S15: STOP), on the other hand, the control unit 3 stops the movement of the display unit D, and returns to the original guidance process.

In the determination in step S13, in a case where the pressing force detected in step S12 is neither equal to nor greater than the first threshold in the determination in step S13 (step S13: NO), on the other hand, the control unit 3 then determines whether the pressing force detected in step S12 is equal to or smaller than the second threshold (step S16). It should be noted that the second threshold is a smaller value than the first threshold as mentioned above. In a case where it is determined in step S16 that the pressing force detected in step S12 is neither equal to nor smaller than the second threshold (step S16: NO), the control unit 3 returns to the original guidance process, without rotating or moving the display unit D. In a case where the pressing force detected in step S12 is equal to or smaller than the second threshold in the determination in step S16 (step S16: YES), on the other hand, the control unit 3 controls the drive unit 15 to rotate or move the display unit D in the second direction corresponding to the pressing force equal to or smaller than the above-mentioned second threshold with respect to the touch sensor 3a or the like at which the above-mentioned contact at one point has been detected (step S17). After that, the control unit 3 moves on to determination in the above-mentioned step S15. At this time, in a case where the above-mentioned contact at the one point is no longer detected, the control unit 3 determines that the rotation or movement in step S17 should be stopped. In a case where the above-mentioned contact at the one point is continuously detected, on the other hand, the control unit 3 determines that the rotation or movement in step S17 should be continued. In a case where it is determined in step S15 that the rotation or movement in step S17 should be continued (step S15: CONTINUE), the control unit 3 returns to step S12, and repeats the above-mentioned control in step S12 and the subsequent steps. In a case where it is determined in step S15 that the rotation or movement in step S17 should be stopped (step S15: STOP), on the other hand, the control unit 3 stops the movement of the display unit D, and returns to the original guidance process.

If contact has been confirmed at the one touch sensor 5b in the left side view in FIG. 4(e) as a result of the above control performed in steps S11 through S17 (step S11: YES, see a "CONTACT" arrow in FIG. 9(a)), for example, the above-mentioned second direction with respect to the touch sensor 5b is a leftward direction shown in FIG. 9(a), and the above-mentioned first direction is a rightward direction shown in FIG. 9(a). In addition, in a case where the pressing force of the contact with the touch sensor 5b is equal to or smaller than the second threshold, the control unit 3 controls the drive unit 15 to move the display unit D leftward as viewed from the front, as shown in an example illustrated in FIG. 9(a). Further, likewise, in a case where the pressing force of the contact with the touch sensor 5b is equal to or greater than the first threshold, the control unit 3 controls the drive unit 15 to move the display unit D rightward as viewed from the front, as shown in the example illustrated in FIG. 9(a). Further, if contact has been confirmed at the one touch sensor 6b in the right side view in FIG. 4(f) (step S11: YES, see a "CONTACT" arrow in FIG. 9(b)), for example, the above-mentioned second direction with respect to the touch sensor 6b is a rightward direction shown in FIG. 9(b), and the above-mentioned first direction is a leftward direction shown in FIG. 9(b). In a case where the pressing force of the contact with the touch sensor 6b is equal to or smaller than the second threshold, the control unit 3 then controls the drive unit 15 to move the display unit D rightward as viewed from the front, as shown in an example illustrated in FIG. 9(b). Further, likewise, in a case where the pressing force of the contact with the touch sensor 6b is equal to or greater than the first threshold, the control unit 3 controls the drive unit 15 to move the display unit D leftward as viewed from the front, as shown in the example illustrated in FIG. 9(b).

Further, if contact has been confirmed at the one touch sensor 3b in the top view in FIG. 4(c) (step S11: YES, see a "CONTACT" arrow in FIG. 9(c)), for example, the above-mentioned second direction with respect to the touch sensor 3b is an upward direction shown in FIG. 9(c), and the above-mentioned first direction is a downward direction shown in FIG. 9(c). In a case where the pressing force of the contact with the touch sensor 3b is equal to or smaller than the second threshold, the control unit 3 then controls the drive unit 15 to move the display unit D upward as viewed from the front, as shown in an example illustrated in FIG. 9(c). Further, likewise, in a case where the pressing force of the contact with the touch sensor 3b is equal to or greater than the first threshold, the control unit 3 controls the drive unit 15 to move the display unit D downward as viewed from the front, as shown in the example illustrated in FIG. 9(c).

Further, if contact has been confirmed at the one touch sensor 6a in the right side view in FIG. 4(f) (step S11: YES, see a "CONTACT" arrow in FIG. 9(d)), for example, the above-mentioned second direction with respect to the touch sensor 6a is a clockwise direction shown in FIG. 9(d), and the above-mentioned first direction is a counterclockwise direction shown in FIG. 9(d). In a case where the pressing force of the contact with the touch sensor 6a is equal to or smaller than the second threshold, the control unit 3 then controls the drive unit 15 to rotate the display unit D clockwise as viewed from the front, as shown in an example illustrated in FIG. 9(d). Further, likewise, in a case where the pressing force of the contact with the touch sensor 6a is equal to or greater than the first threshold, the control unit 3 controls the drive unit 15 to rotate the display unit D counterclockwise as viewed from the front, as shown in the example illustrated in FIG. 9(d).

Further, if contact has been confirmed at one point on the touch panel 14 (step S11: YES, see a "CONTACT" arrow in FIG. 9(e)), for example, the above-mentioned second direction with respect to the touch panel 14 is a forward direction (the direction from the drive unit 15 toward the display unit D) shown in FIG. 9(e), and the above-mentioned first direction is a backward direction (the direction from the display unit D toward the drive unit 15) shown in FIG. 9(e). In a case where the pressing force of the contact with the touch panel 14 is equal to or smaller than the second threshold, the control unit 3 then controls the drive unit 15 to move the display unit D forward, as shown in an example illustrated in FIG. 9(e). Further, likewise, in a case where the pressing force of the contact with the touch panel 14 is equal to or greater than the first threshold, the control unit 3 controls the drive unit 15 to move the display unit D backward, as shown in an example illustrated in FIG. 9(e).

In a case where the contact only at one point of the touch sensor 3a or the like is not detected in the determination in step S11 (step S11: NO), on the other hand, the control unit 3 next determines whether the contact has been detected at the touch sensor 1a and the like at two or more points on the front surface and two or more points on the back surface (a total of four or more points) of the display unit D (such as the touch sensor 1b and the touch sensor 1e (the front surface of the display unit D), and the touch sensor 2b and the touch sensor 2e (the back surface of the display unit D)) (step S18). In the determination in step S18, in a case where the above-mentioned contact has not been detected at each of the four or more touch sensors 1a and the others (step S18: NO), the control unit 3 returns to the original guidance process.

In the determination in step S18, in a case where the above-mentioned contact has been detected at each of the four or more touch sensors 1a and the others (step S18: YES), on the other hand, the control unit 3 then determines whether each contact pattern on the front surface and the back surface is the above-mentioned gripping contact pattern (step S19). In the determination in step S19, the control unit 3 reads out the above-mentioned gripping contact pattern data from the recording unit 11 when the result is determined to be "YES" in the determination in step S18, and compares the gripping contact pattern data with the contact pattern detected at that point of time (see step S18: YES).

In the determination in step S19, in a case where each contact pattern detected in step S18 is not the above-mentioned gripping contact pattern (step S19: NO), the control unit 3 returns to the original guidance process. In a case where it is determined in step S19 that each contact pattern detected in step S18 is the above-mentioned gripping contact pattern (step S19: YES), on the other hand, the control unit 3 then drives the fixing motor 33 and the fixing motor 38 of the fixing unit 17 via the fixing control unit 18, to move the moving member 30 and the moving member 35 in respective directions away from the center of the back surface of the display unit D. As a result, the fixing rods 30d and 30e, and the fixing rods 35d and 35e are pulled out from the through holes 20b and 20c, so that the display unit D that has been fixed to the receiving portion 20a becomes detachable from the joining arm 20 (step S20) while remaining gripped by the user (see step S19: YES). After that, the control unit 3 returns to the original guidance process.

It should be noted that the display unit D detached from the joining arm 20 is used in a process unrelated to the functions of the navigation apparatus NV, such as displaying a video image in the rear seat. In such a case, the distance between the navigation apparatus NV and the display unit D after the detachment from the joining arm 20 may be detected with a wireless distance sensor or the like, and, when the detected distance is equal to or longer than a preset distance (one meter, for example), the above-mentioned unrelated process may be started.

Next, a process to be performed in the display unit D in a case where the display unit D detached from the joining arm 20 in step S20 is again fixed to the joining arm 20 is described with reference to FIG. 10. It should be noted that the process shown in the flowchart in FIG. 10 is a process to be performed primarily by the fixing control unit 18 and the display control unit 19 of the display unit D.

As shown in FIG. 10, after the display unit D is detached from the joining arm 20, the display control unit 19 performs monitoring to determine whether a preset instruction operation to fix the display unit D to the joining arm 20 again is performed on the touch panel 14 (step S25). In a case where the instruction operation is not performed in the monitoring in step S25 (step S25: NO), the display control unit 19 determines whether, for example, the power supply for the display unit D has been turned off (step S29). In a case where the power supply is off in the determination in step S29 (step S29: YES), the display control unit 19 and the fixing control unit 18 end the respective processes that have been performed therein. In a case where the power supply is not off in the determination in step S29 (step S29: NO), on the other hand, the display control unit 19 returns to the determination in the above-mentioned step S25.

In a case where the above-mentioned instruction operation is performed in the monitoring in step S25 (step S25: YES), on the other hand, the display control unit 19 activates the camera 16 to image the imaging range facing the back surface of the display unit D, and displays a result of the imaging on the display surface F (step S26). Thus, the user holding the display unit D can move the display unit D itself to a position to be fixed to the joining arm 20, using the image of the receiving portion 20a as a clue shown in the displayed imaging result. After that, the display control unit 19 and the fixing control unit 18 perform monitoring to determine whether the fixing of the display unit D to the joining arm 20 by the fixing unit 17 has been completed (step S27). In a case where the fixing has not been completed in the monitoring in step S27 (step S27: NO), the display control unit 19 and the fixing control unit 18 return to step S26 mentioned above. In a case where the fixing has been completed in the monitoring in step S27 (step S27: YES), on the other hand, the display control unit 19 stops the driving of the camera 16, and also stops the display of the above-mentioned imaging result on the display surface F (step S28). After that, the display control unit 19 and the fixing control unit 18 moves on to the determination in step S29.

As described specifically above, in a case where the display unit D is fixed to the joining arm 20, when contact with or proximity to the display unit D from the side of the display surface F is detected, and contact with or proximity to the display unit D from the back surface side is also detected, the display unit D can be made detachable from the joining arm 20 (see step S20 in FIG. 7) through control of rotation, movement, or the like of the display unit D according to the example. Thus, the display unit D can be readily detached, in accordance with contact with or proximity to the display unit D as intended by the user.

Furthermore, two regions of the display unit D on the side of the display surface F and two regions of the display unit D on the back surface side are contact regions. When contact with or proximity to a contact region on the side of the display surface F is detected, and contact with or proximity to a contact region on the back surface side is detected, that is, when the display unit D is gripped, the display unit D can be detached from the joining arm 20 (see step S19 and step S20 in FIG. 7). Thus, it is possible to prevent inadvertent dropping or the like of the display unit D when the display unit D is detached from the joining arm 20.

Furthermore, each of the above-mentioned contact regions is a predetermined region. Thus, detachment of the display unit D due to an erroneous operation can be prevented, and dropping of the display unit D at a time of detachment can be more reliably prevented.

Further, there is a plurality of contact regions on the side of the display surface F, and there is a plurality of contact regions on the back surface side respectively. Thus, dropping of the display unit D at a time of detachment can be more reliably prevented.

Furthermore, in a case where the display unit D is again fixed to the joining arm 20, an image corresponding to a result of imaging performed by the camera 16 to capture an image of the joining arm 20 located in the imaging range facing the back surface of the display unit D is displayed on the display surface F (see step S26 in FIG. 10). Thus, when the display unit D is fixed to the joining arm 20, the display unit D can be moved and fixed to the joining arm 20 certainly while the position of the joining arm 20 is displayed on the display surface F.

Further, the fixing unit 17 that fixes the display unit D to the joining arm 20 is provided on the back surface of the display unit D, and the fixing unit 17 is driven to switch the display unit D fixed to the joining arm 20 from a fixed state to a detachable state. Thus, it is possible to switch between the fixed state and the detachable state certainly.

It should be noted that, in addition to the configuration according to the example mentioned above, detection of contact with the touch panel 14 may also be included in the conditions for making the display unit D detachable from the joining arm 20 (in other words, the conditions for a gripping operation according to the example to be allowed). In this case, contact on the side of the display surface F at a time of detachment becomes easier. Thus, dropping of the display unit D can be prevented conveniently and more reliably.

In the example mentioned above, the pressing direction in step S9 in FIG. 7 is detected as changes in the positions at which the above-mentioned pressing forces have been detected. However, the direction of weight applied by a finger or a palm or the like of the user may be detected with a weight sensor (not shown) provided in the receiving portion 20*a* shown in FIG. 5, for example, so that the pressing direction is detected. Alternatively, although the position of contact with the touch sensor 1*a* or the like does not change, a change in the weight by the above-mentioned finger, the palm, or the like at the position may be detected with the touch sensor 1*a* or the like, so that the pressing direction is detected.

Further, in the structure of the above-mentioned example, the display unit D is moved forward or backward relative to the drive unit 15 by the pressing caused by contact with the touch panel 14 (see FIG. 9(*e*)). However, as the another way, the display unit D can also be moved above-mentioned forward or backward in accordance with a result of comparison between the pressing force caused by contact with one of the touch sensors 2*a* through 2*f* provided on the back surface of the display unit D and two preset thresholds.

Further, the display unit D can be tilted upward or downward about a horizontal axis extending through the center of the display unit D, or the display unit D can be tilted leftward or rightward about a vertical axis extending through the center of the display unit D (that is, the display unit D is made to tilt vertically or horizontally), in accordance with a result of comparison between the pressing force caused by contact with the touch sensor 1*a* or the like provided on the front surface of the display unit or the touch sensor 2*a* or the like provided on the back surface of the display unit D, and two preset thresholds. In this case, when contact with the touch sensor 1*a* is made with a greater pressing force than a preset threshold, for example, the display unit D can be made to tilt backward (that is, in such a direction that the display surface F faces upward). When contact with the touch sensor 1*a* is made with a smaller pressing force than the other threshold that is smaller than the preset threshold, the display unit D can be made to tilt forward (that is, in such a direction that the display surface F faces downward).

Furthermore, in a case where transfer of magnetic force is enabled between the fixing unit 17 and the receiving portion 20*a* at an end of the joining arm 20 at a time of re-fixing of the display unit D to the joining arm 20 as shown in FIG. 10, and a preset magnetic force pattern is detected on each side, the joining arm 20 including the receiving portion 20*a* may be moved (driven) so that the receiving portion 20*a* approaches the display unit D located in the vicinity. That is, the position of the display unit D located in the vicinity of the joining arm 20 may be detected, and, in accordance with the detected position, the joining arm 20 may be moved relative to the display unit D so as to approach the display unit D. In this case, the display unit D can be more easily fixed to the joining arm 20. Here, the receiving portion 20*a* capable of detecting the above-mentioned magnetic force and the joining arm 20 is equivalent to an example of the "position detecting unit" according to the present application, and the drive unit 15 is equivalent to an example of the "moving unit" according to the present application.

Further, a program corresponding to the flowchart shown in FIG. 7 may be recorded in a recording medium such as an optical disk or a hard disk or be acquired via a network such as the Internet, and be read into and executed in a general-purpose microcomputer or the like. In this manner, the microcomputer or the like can be made to function as the control unit 3 according to the embodiment.

EXPLANATION OF REFERENCE NUMERALS

1 First detection unit
1*a*, 1*b*, 1*c*, 1*d*, 1*e*, 1*f*, 2*a*, 2*b*, 2*c*, 2*d*, 2*e*, 2*f*, 3*a*, 3*b*, 3*c*, 4*a*, 4*b*, 4*c*, 5*a*, 5*b*, 5*c*, 6*a*, 6*b*, 6*c* Touch sensor
2 Second detection unit
3 Control unit
14 Touch panel
15 Drive unit
15*a* Drive
15*b* Rotary motor
15*c* Up-down slide motor
15*d* Left-right slide motor
15*e* Front-back slide motor
16 Camera
17 Fixing unit
18 Fixing control unit
19 Display control unit
20 Joining arm
S Control apparatus
D Display unit
F Display surface
NV Navigation apparatus

The invention claimed is:

1. A fixing apparatus comprising
a first detection unit that detects contact with or proximity to a display unit from a side of a display surface of the display unit, the display unit being supported by a support unit and comprising the display surface;
a second detection unit that detects contact with or proximity to the display unit from the opposite side from the display surface; and
a control unit that, in a case where the display unit is fixed to a joining unit that joins the support unit to the display unit, makes the display unit detachable from the joining unit, when the contact or the proximity from the side of the display surface is detected by the first detection unit and the contact or the proximity from the opposite side is detected by the second detection unit.

2. The fixing apparatus according to claim 1, wherein
the first detection unit includes each of two regions of the display unit on the side of the display surface as a first detection region for the contact or the proximity,
the second detection unit includes each of two regions of the display unit on the opposite side as a second detection region for the contact or the proximity, and,
when the contact with or the proximity to each first detection region is detected by the first detection unit, and the contact with or the proximity to each second detection region is detected by the second detection unit, the control unit makes the display unit detachable from the joining unit.

3. The fixing apparatus according to claim 2, wherein
each of the first detection regions and the second detection regions is a preset region.

4. The fixing apparatus according to claim 1, wherein
the first detection unit includes a plurality of regions in the display unit on the side of the display surface as detection regions for the contact or the proximity, and
the second detection unit includes a plurality of regions in the display unit on the opposite side as detection regions for the contact or the proximity.

5. The fixing apparatus according to claim 1, wherein the first detection unit is a touch panel provided on the display surface.

6. The fixing apparatus according to claim 1, wherein
the display unit further comprises:
an imaging unit that has an imaging range being an range facing the opposite side; and
a display control unit that causes the display surface to display an image corresponding to a result of imaging performed by the imaging unit to image the joining unit located within the imaging range.

7. The fixing apparatus according to claim 1, wherein
a fixing unit that fixes the display unit to the joining unit is comprised on a surface on the opposite surface of the display unit; and
the control unit drives the fixing unit, to switch the display unit fixed to the joining unit from a fixed state to a detachable state.

8. The fixing apparatus according to claim 1, further comprising:
a position detecting unit that detects a position of the display unit approaching to the joining unit; and
a moving unit, in accordance with the detected position, that moves the joining unit relative to the display unit to cause the joining unit to approach the display unit.

9. A fixing method implemented in a fixing apparatus that comprises: a first detection unit that detects contact with or proximity to a display unit from a side of a display surface of the display unit, the display unit being supported by a support unit and including the display surface; a second detection unit that detects contact with or proximity to the display unit from the opposite side from the display surface; and a control unit,
the fixing method comprising
a control step of making, in a case where the display unit is fixed to a joining unit that joins the support unit to the display unit, the display unit detachable from the joining unit, when the contact or the proximity from the side of the display surface is detected by the first detection unit, and the contact or the proximity from the opposite side is detected by the second detection unit, the control step being carried out by the control unit.

10. A fixing program to be executed by a computer in a fixing apparatus that comprises: a first detection unit that detects contact with or proximity to a display unit from a side of a display surface of the display unit, the display unit being supported by a support unit and including the display surface; a second detection unit that detects contact with or proximity to the display unit from the opposite side from the display surface; and a control unit,
the fixing program causing the computer to function as
a control unit that makes, in a case where the display unit is fixed to a joining unit that joins the support unit to the display unit, the display unit detachable from the joining unit, when the contact or the proximity from the side of the display surface is detected by the first detection unit, and the contact or the proximity from the opposite side is detected by the second detection unit.

* * * * *